March 4, 1924. 1,485,440
M. STÖHR
APPLIANCE FOR PURIFYING AND MOISTENING AIR
Filed Aug. 13, 1923 2 Sheets-Sheet 1

Inventor
M. Stöhr
By Marks v Clerk
Attys.

March 4, 1924. 1,485,440
M. STÖHR
APPLIANCE FOR PURIFYING AND MOISTENING AIR
Filed Aug. 13, 1923   2 Sheets-Sheet 2
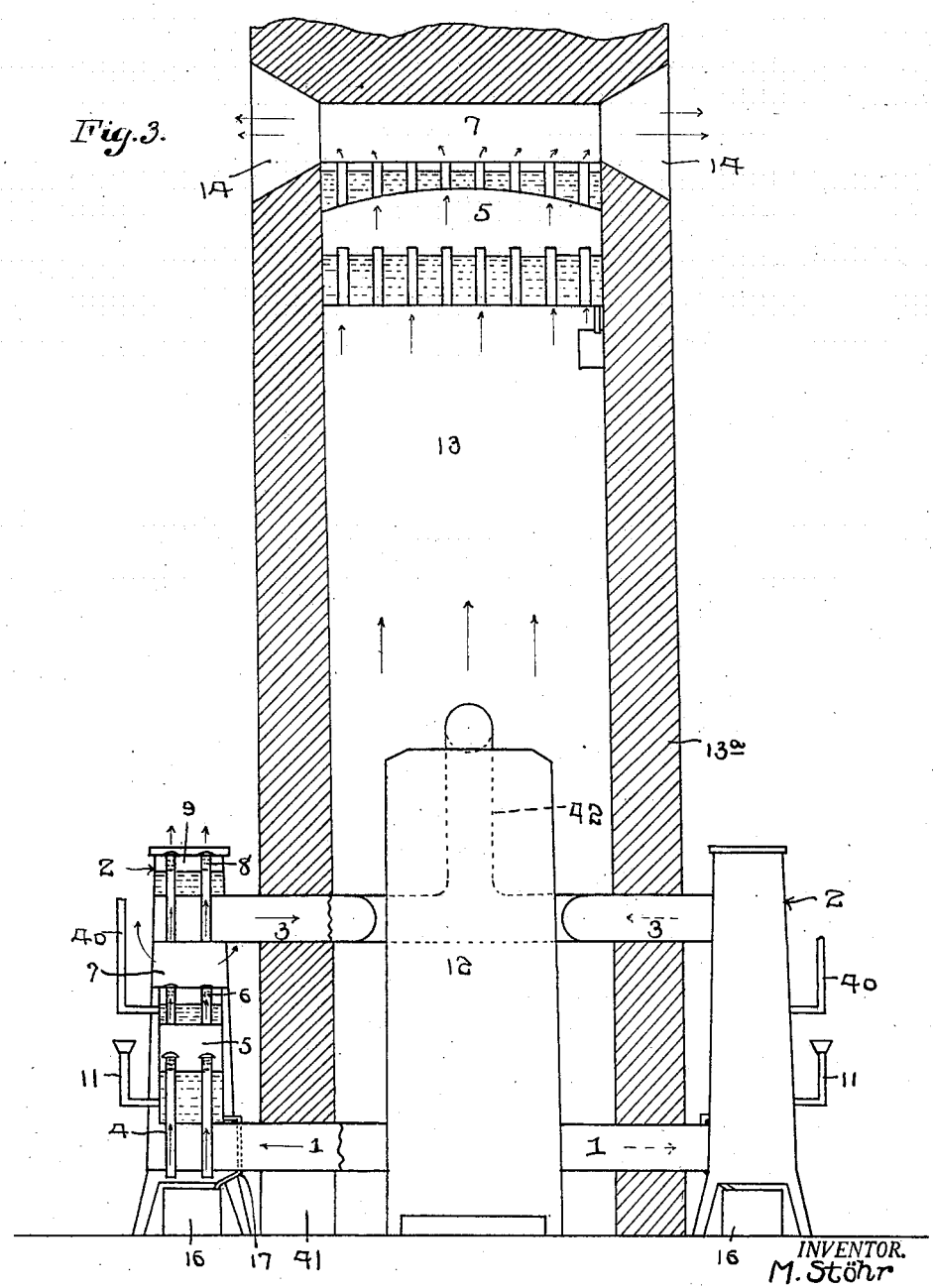

Patented Mar. 4, 1924.

1,485,440

UNITED STATES PATENT OFFICE.

MIROCLAV STÖHR, OF PRAGUE, CZECHOSLOVAKIA.

APPLIANCE FOR PURIFYING AND MOISTENING AIR.

Application filed August 13, 1923. Serial No. 657,187.

*To all whom it may concern:*

Be it known that I, MIROCLAV STÖHR, a citizen of the Republic of Czechoslovakia, and residing at 32 Stopanska Ulice, Prague, Czechoslovakia, have invented certain new and useful Improvements in and Relating to Appliances for Purifying and Moistening Air, of which the following is a specification.

This invention relates to improvements in apparatus for purifying and moistening air according to which an intimate mixing of air and vapor is caused to take place in a water-containing moistening chamber which latter is heated directly or indirectly by the products of combustion from a stove or furnace. The top or roof of the moistening chamber is of such form as to afford a relatively large surface area and it also constitutes the heat insulating bottom of a second water chamber through which pass tubes communicating with the moistening chamber. The water resulting from the condensation of the vapor passes downwardly through the tubes into the moistening chamber through which latter said water falls upon cap-like elements and is thereby finely divided so as to increase the air moistening and purifying effect of the apparatus.

In the accompanying drawing wherein an approved embodiment of the invention is illustrated:

Figure 1:
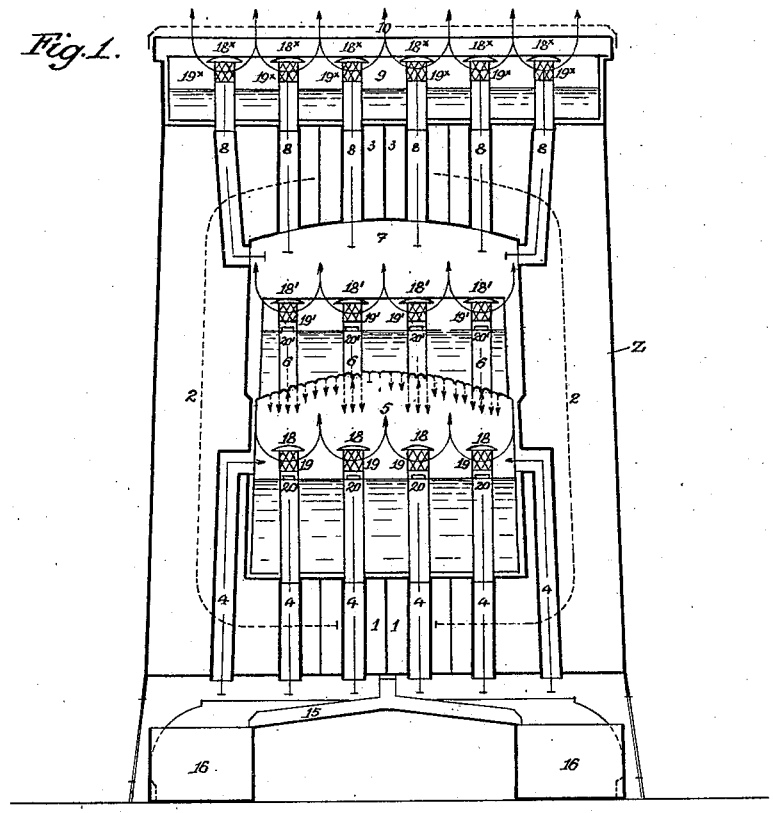
Fig. 1 is a diagrammatic sectional view through the air moistening and purifying apparatus.

At 1 the heating gases from a stove or furnace flow into a heating appliance Z, through which they pass from the bottom to the top in two streams 2, after which they enter the outlet pipe at 3.

These smoke gases first contact and heat the tubes 4, through which the air of the room passes into the moistening chamber 5, which is also heated by the smoke gases surrounding it. The latter chamber is filled with water through the funnel 11 until the surface of the water is approximately on a level with the lateral slits 20 in the tubes 4, while the air, sweeping directly over the water, enters the chamber 5 through the holes 19. The ends of the tubes 4 are covered with closure caps 18. By means of this arrangement the air in the room is first moistened, the impurities carried along with it being partially deposited in the water. Such impurities as will float on the surface of the water are carried with the latter through the circumferential slits 20 in the tubes 4 when the level of the water rises above the slits. The water which thus passes through the slits 20 flows downwardly along the inside of the walls of the tubes 4 drop by drop into pans 15, from which it passes to the collecting vessel 16. Heavy impurities, which sink to the bottom in the chamber 5, may be drawn off by means of a pipe 17.

In order to make this partial moistening and purifying of the air of the room more perfect a second heat insulated chamber 7 is provided in the heating appliance, through which chamber tubes 6 pass, which open at one end into the top of the moistening chamber 5 above the covers of the tubes 4 and are provided at their other ends at a certain distance below the top of the chamber 7 with closure caps 18′, the holes 19′ and the circumferential slits 20′. The chamber 7 is filled with water by hand or by means of a constant level water feeding device 40, which works in a known manner with a float, which water is used in the chambers 5 and 7 for replacing the water evaporated and that also which flows off through the slits 20 and 20′. The water passing drop by drop through the slits 20′ of the tubes 6 along the inside of the walls of the latter enters the chamber 5 and dropping upon the cups 18 of the tubes 4 is broken up into small particles. These particles of water, before falling into the body of water in the chamber 5, pass through the rising air, moistens it again and separate out the impurities. The vapours, as they develop in the chamber 5, impinge against the cooled top of this chamber, are condensed there and fall back into the chamber.

The air as it leaves the tubes 4 is thus forced to pass upwardly through the vapour, taking up moisture and giving off its impurities.

From the chamber 7 the moistened and purified air passes either directly into the compartment to be heated or is conducted by chamber 7, through the tubes 8 into the water chamber 9, which latter is open to the atmosphere and is exposed to the action of the heating gases and in which, owing to the arrangement of the upper ends of the tubes 8 having caps 18× and holes 19×, the air is caused to sweep over the water. The air then finally leaves the appliance by way of the sieve 10.

Referring to Fig. 3 wherein several of the improved air moistening and purifying appliances are shown applied to a conventional type of stove, the latter is indicated at 12 and is located within a jacket or housing 13ª having an internal air heating chamber 13 and a cold air inlet 41 through which latter the cold air is admitted to the chamber 13. The inlets 1 for conducting the heated gases and products of combustion from the stove 12 to the heating appliances Z are suitably connected with the stove while the outlet connections 3 for the products of combustion are connected with a flue 42 through which said products of combustion are carried off.

Figure 2:
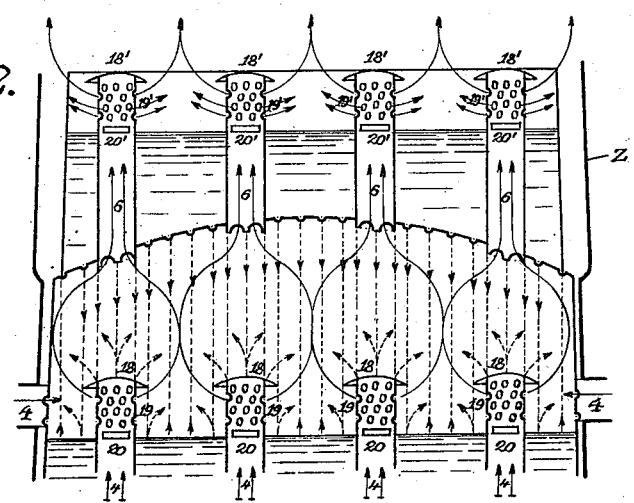
Fig. 2 is an enlarged fragmentary view through the medial portion of the apparatus showing the two lowermost moistening chambers, and, Fig. 3 is a detail view showing the invention applied to a stove or furnace, two ot the moistening and purifying devices being shown, one in section, and one in elevation.

A moistening chamber 5 is preferably located in the upper portion of the chamber 13 which is substantially identical in construction to the moistening chamber designated by the corresponding reference numeral in Figs. 1 and 2 and it is also equipped with tubes through which the heated air rises and finally passes out of the chamber 7 through the warm air outlets 14. The products of combustion conducted to the heating appliances Z by the pipe 1 circulate about the several groups of tubes 4 and 8 and the chambers 5 and 7 thereby warming the air passing through the appliance, the heated air being finally discharged from the appliances through the open upper portions of the uppermost chamber 9.

What I claim is:—

1. An appliance for purifying and moistening the air of rooms, comprising in combination a heating device, a moistening chamber heated by the said heating device, a water chamber which is open to the atmosphere and is located immediately above the said moistening chamber, a member having an extensive superficial area, which member is both the roof of the moistening chamber and the bottom wall of the water chamber and air conveying tubes extending through the said member into the water chamber, as and for the purpose set forth.

2. An appliance for purifying and moistening air comprising in combination, a heating device, a moistening chamber heated by said heating device, a water chamber open to the atmosphere and located immediately above the said moistening chamber, a member having an extensive superficial area constituting the roof of the moistening chamber and the bottom wall of the water chamber, air conveying tubes extending through said member into the water chamber, air admitting tubes extending into the moistening chamber, air outlet tubes extending from the water chamber and communicating with the atmosphere, said tubes having air outlet holes adjacent the top thereof and covering caps arranged at the tops of the tubes.

3. An appliance as claimed in claim 2, in which the air conveying tubes are disposed axially above the air admission tubes, as and for the purpose set forth.

In testimony whereof I have signed my name to this specification.

Ing. MIROCLAV STÖHR.

Witnesses:
KLAS KETTELER,
OSTHIN SCHWEINBURG.